(12) United States Patent
Yang et al.

(10) Patent No.: US 8,640,957 B2
(45) Date of Patent: Feb. 4, 2014

(54) METHOD AND APPARATUS FOR LOCATING BAR CODES INCLUDING QR CODES

(75) Inventors: Yang Yang, Toronto (CA); Eunice Poon, Markham (CA)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/602,485

(22) Filed: Sep. 4, 2012

(65) Prior Publication Data

US 2013/0153663 A1    Jun. 20, 2013

Related U.S. Application Data

(60) Provisional application No. 61/577,801, filed on Dec. 20, 2011.

(51) Int. Cl.
*G06K 7/10* (2006.01)

(52) U.S. Cl.
USPC .................................................. 235/462.09

(58) Field of Classification Search
USPC .......................... 235/462.01–462.2
See application file for complete search history.

(56) References Cited

U.S. PATENT DOCUMENTS

| | | | |
|---|---|---|---|
| 5,726,435 A | 3/1998 | Hara et al. | |
| 6,032,861 A | 3/2000 | Lemelson et al. | |
| 6,045,046 A * | 4/2000 | Detwiler | 235/114 |
| 6,267,296 B1 | 7/2001 | Ooshima et al. | |
| 6,398,117 B1 | 6/2002 | Oakeson et al. | |
| 6,863,218 B2 | 3/2005 | Muramatsu | |
| 6,983,886 B2 | 1/2006 | Natsukari et al. | |
| 7,287,053 B2 | 10/2007 | Bodin | |
| 7,325,737 B2 | 2/2008 | Epshteyn et al. | |
| 7,546,950 B2 * | 6/2009 | Thiyagarajah | 235/462.09 |
| 2002/0074405 A1 * | 6/2002 | Hadano et al. | 235/462.08 |
| 2006/0050961 A1 | 3/2006 | Thiyagarajah | |
| 2007/0071320 A1 | 3/2007 | Yada | |
| 2007/0125861 A1 | 6/2007 | Shoobridge | |
| 2010/0155464 A1 | 6/2010 | Swayn et al. | |

* cited by examiner

*Primary Examiner* — Christle Marshall

(57) ABSTRACT

A method for identifying a QR code in an image includes inputting an image, and using one or more computer processor to identify edges in the image; create an edge count image; label connected regions in the edge count image; create a candidate region list; for each individual candidate in the candidate region list: find regions that overlap with the region in the individual candidate; group regions that overlap into a group of overlapped regions; for each group: merge the overlapped regions into a merged region; add each merged region to the candidate region list to form a new candidate region list; and perform decoding of a QR code in each region in the new candidate region list.

11 Claims, 18 Drawing Sheets

Barcode 1

News Letter

SEIKO EPSON CORPORATION           1998.03.10

Employ News

Congratulation to the Arbor Footwear soccer team! They took first place in the recent city competition. Special thanks to team captain Bruno Martin(manufacturing),who told a TV reporter, "Great shoes are part of a sound strategy".

1. Writing contest winner

Maria Selvat took second place in the city's humorous essay contest. Co-workers encouraged her to write down the stories she tells on break time, Her winning story, "I was'nt born to ski." was their all-time favorite, told while they were singing the sast on her leg.

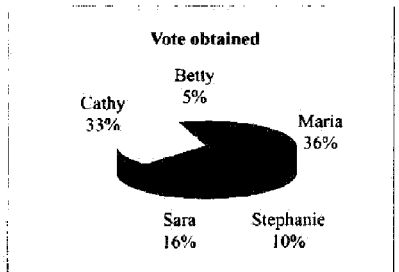

2. Wedding Bells

Best wishes to Thomas Bendel(women's dress shoe division) and Isabelle Mendel (administration), who married last Friday night . For fun, co-workers pre-pared a hyphenated name plate for Isabelie's office door. It read : "Dr. Isabelle Mendel-Bendel."

EPSON EvaluationSample 1998/2/14
No.A07A4004

Inventory List

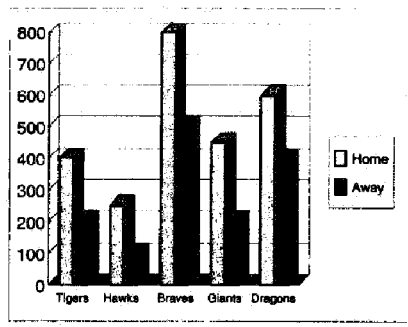

3. Autographs, anyone?

Tongue Tied, our company robot, seems to have a competitive side to him. As a publicity gimmick, marketing entered him in a nation-wide computer games contest last week. Scores on arcade computer games. Tongue Tied rolled away with not only top honors, but the world-record score for all three games.

Although all prizes went to the humans, the company sponsoring the contest created a special plaque for Tongue Tied to commemorate his win.

MS-Word Ver.7.0 for Windows

Barcode 2

FIG. 1

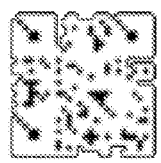
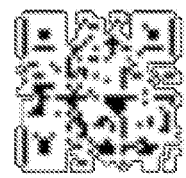
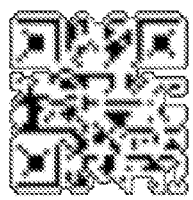
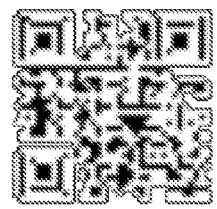
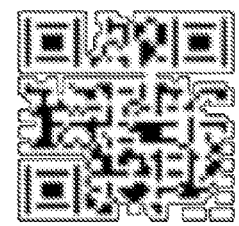
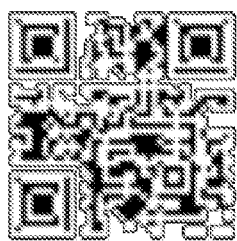
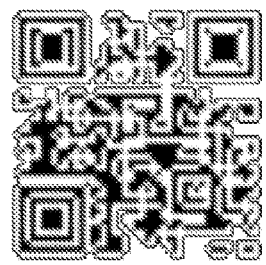
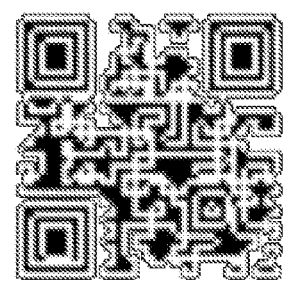
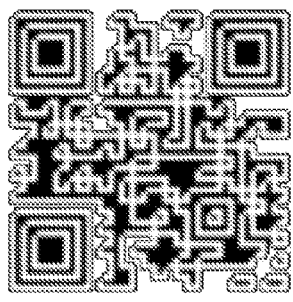
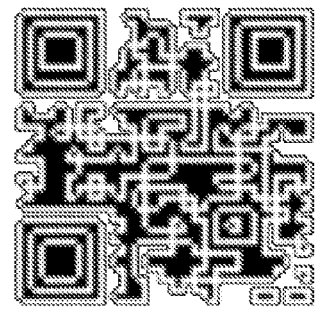
FIG. 9

METHOD AND APPARATUS FOR LOCATING BAR CODES INCLUDING QR CODES

CROSS-REFERENCE TO RELATED APPLICATION(S)

This application claims the benefit under 35 U.S.C. 119(e) of Provisional Patent Application No. 61/577,801, filed Dec. 20, 2011, which is hereby incorporated by reference in its entirety.

BACKGROUND

Field of Invention

Barcodes have been utilized for identifying and pricing objects for more than forty years. A barcode is an optical, machine-readable representation of data. The data represents information (e.g. an id linked to price and name) about the object to which the bar code is attached. Originally, barcodes represented data by varying the widths of, and spacing between, parallel lines, and may be referred to as linear or 1 dimensional (1D). More recently, they have evolved into rectangles, dots, hexagons and other geometric patterns in 2 dimensions (2D). Although 2D systems use a variety of symbols, they are generally referred to as barcodes as well. Barcodes originally were scanned by special optical scanners called barcode readers; later, scanners and interpretive software became available on devices including desktop printers, smartphones and scanners.

In some instances one image may include multiple barcodes: some of them are horizontal or vertical, and some of them are rotated. Prior barcode identification methods will only decode (identify) the horizontal or vertical barcodes and fail to decode the rotated ones. FIG. 1 shows one such example. On this image, there are 2 barcodes: barcode 1 is on the top right of the image and barcode 2 is on the center bottom of the image. Barcode 1 is the rotated barcode (the rotation angle is about)10° while barcode 2 is almost horizontal. Prior barcode identification methods decode barcode 2 correctly while failing to decode barcode 1.

Thus, an improved method is needed for decoding two barcodes in the same image where one of the barcodes is rotated relative to the other.

A QR code (abbreviated from Quick Response code) is a type of matrix barcode (or two-dimensional code) first designed for the automotive industry. More recently, the system has become popular outside of the industry due to its fast readability and comparatively large storage capacity. The code consists of black modules arranged in a square pattern on a white background. The information encoded can be made up of any kind of data (e.g., binary, alphanumeric, or Kanji symbols). Some commercial scanners, such as those manufactured by Epson, have the functionality to decode QR codes.

Commonly owned U.S. Pat. No. 7,546,950, issued Jun. 16, 2009 discloses a method for locating and decoding a QR code. The method first locates some QR candidate regions and then tries to decode the QR code in each candidate region. The QR candidate region is located by detecting connected regions from edge count images that are created from a down-scaled edge map of the input image. The method works well when QR module size is not very large; however, it has limitations when a QR code's module size becomes large. U.S. Pat. No. 7,546,950 is incorporated herein by reference in its entirety.

Thus an improved method is needed for locating large QR codes.

SUMMARY OF INVENTION

An object of the present invention is to improve the accuracy of barcode identification.

Specifically, an object is to identify barcodes that are rotated or skewed in an image that also contains an additional barcode, which may be vertical or horizontal.

In a preferred embodiment, a method for identifying at least two barcodes in the same image with one barcode being rotated with respect to another barcode, comprises: inputting an image, and using one or more computer processors to: decode a horizontal or vertical barcode in the image; and next, decode a rotated barcode in the image, the rotated barcode being rotated with respect to the horizontal or vertical barcode.

Thus, in the present invention, a module to decode a rotated barcode always runs after the module to decode a horizontal or vertical barcode in order to improve the accuracy for identifying and/or decoding two or more barcodes in the same image with at least one barcode having a different orientation (rotated or skewed) with relation to at least one other barcode in the image.

Another object is to improve the accuracy of identification of QR barcodes, specifically large QR barcodes.

In a preferred embodiment, a method for identifying a QR code in an image includes inputting an image, and using one or more computer processors to identify edges in the image; create an edge count image; label connected regions in the edge count image; create a candidate region list; for each individual candidate in the candidate region list: find regions that overlap with the region in the individual candidate; group regions that overlap into a group of overlapped regions; for each group: merge the overlapped regions into a merged region; add each merged region to the candidate region list to form a new candidate region list; and perform decoding of a QR code in each region in the new candidate region list.

In another embodiment, finding regions that overlap with the region in the individual candidate comprises:

finding horizontal overlap between two regions, region1 and region2 as follows $$DisCx = |cx2 - cx1|,$$

$$W1 = \frac{\text{width of } region1}{2},$$

$$W2 = \frac{\text{width of } region2}{2}$$

If $(DisCx < W1 + W2)$ then two regions are overlapped where cx1 is the center of region1 in the x direction and cx2 is the center of region2 in the x direction.

In a further embodiment, finding regions that overlap with the region in the individual candidate comprises:

finding vertical overlap between two regions, region1 and region2 as follows $$DisCy = |cy2 - cy1|,$$

$$H1 = \frac{\text{height of } region1}{2},$$

-continued $$H2 = \frac{\text{height of } region2}{2}$$

If $(DisCy < H1 + H2)$ then two regions are overlapped where cy1 is the center of region1 in the y direction and cy2 is the center of region2 in the y direction.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts:

FIG. 1 illustrates an image with multiple barcodes, one of which is rotated or skewed with respect to the other barcode;

FIG. 9 shows a downscaled edge count image generated from FIG. 8;

DESCRIPTION OF THE PREFERRED EMBODIMENTS

Figure 2:
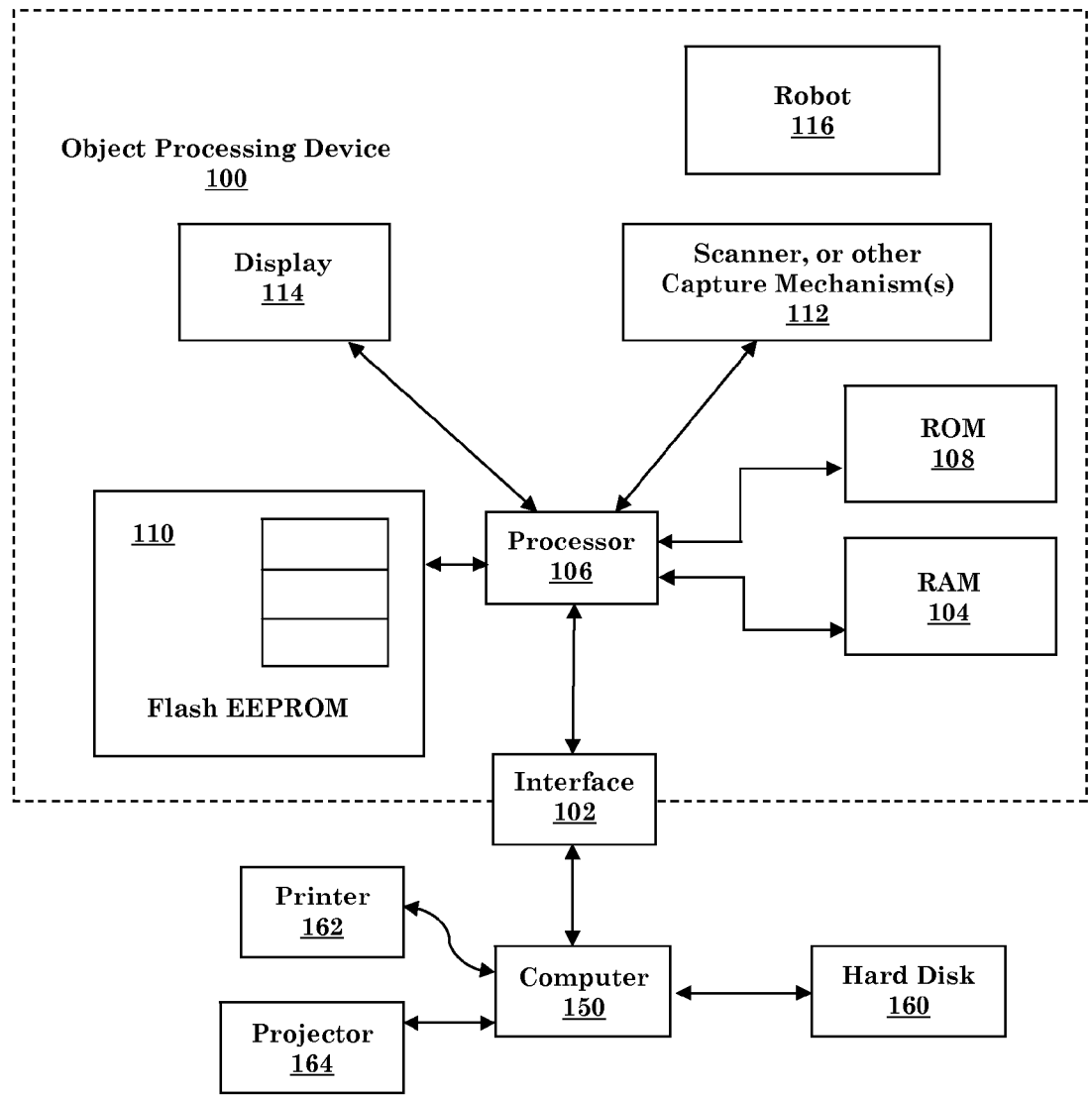
FIG. 2 is a general block diagram of an object processing device and system for utilizing the present invention.

In the following detailed description, reference is made to the accompanying drawings that show, by way of illustration, example embodiments of the invention. In the drawings, like numerals describe substantially similar components throughout the several views. These embodiments are described in sufficient detail to enable those skilled in the art to practice the invention. Other embodiments may be utilized and structural, logical and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

In general, example embodiments relate to methods, devices, and computer-readable media for decoding or recognizing barcodes.

A schematic representation of an example object processing device 100 is shown in FIG. 2. The object processing device 100 exchanges data with a host computer 150 by way of an intervening interface 102. Application programs and an object processing device driver may also be stored for access on the host computer 150. When an image retrieve command is received from the application program, for example, the object processing device driver controls conversion of the command data to a format suitable for the object processing device 100 and sends the converted command data to the object processing device 100. The driver also receives and interprets various signals and data from the object processing device 100, and provides necessary information to the user by way of the host computer 150.

When data is sent by the host computer 150, the interface 102 receives the data and stores it in a receive buffer forming part of a RAM 104. The RAM 104 can be divided into a number of sections, for example through addressing, and allocated as different buffers, such as a receive buffer or a send buffer. Data, such as digital image data, can also be obtained by the object processing device 100 from the capture mechanism(s) 112, the flash EEPROM 110, or the ROM 108. The capture mechanism(s) 112 can be a scanner, for example, and generates a digital image by scanning one or more objects, such as a barcode label on a part to be used in manufacturing and/or assembly of a device such as a printer. The scanner 112 can be controlled by robot 116, for example, or a human, or can be automatically controlled by computer 150, for example. The digital image of the object(s) can then be stored in the receive buffer or the send buffer of the RAM 104.

A processor 106 uses computer-executable instructions stored on a ROM 108 or on a flash EEPROM 110, for example, to perform a certain function or group of functions, such as the method 600 (FIG. 6) and the method 1200 (FIG. 12) for example. Methods 600 and 1200 will be discussed in greater detail later herein. Where the data in the receive buffer of the RAM 104 is a digital image, for example, the processor 106 can implement the methodological acts of the method 600 or 1200 on the digital image. Further processing in an imaging pipeline may then be performed on the digital image before the image is displayed on a display 114, such as an LCD display for example, or transferred to the host computer 150, for printing on printer 162, projected with projector 164, or stored on hard disk 160, for example.

The example methods 600 and 1200 and variations thereof disclosed herein can be implemented using non-transitory computer-readable media for carrying or having computer-executable instructions or data structures stored thereon. Such computer-readable media can be any available media that can be accessed by a processor of a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store program code in the form of computer-executable instructions or data structures and that can be accessed by a processor of a general purpose or special purpose computer. Combinations of the above should also be included within the scope of computer-readable media.

Computer-executable instructions comprise, for example, instructions and data that cause a processor of a general purpose computer or a special purpose computer to perform a certain function or group of functions. Although the subject matter is described herein in language specific to methodological acts, it is to be understood that the subject matter defined in the appended claims is not necessarily limited to the specific acts described herein. Rather, the specific acts described herein are disclosed as example forms of implementing the claims.

In an embodiment, the method steps of the present invention described hereinafter are preferably performed by one or more processors in the object processing device 100 and/or computer 150 executing computer-executable instructions, programs, software, firmware, that are stored or loadable in memory in object processing device 100 and/or computer 150 and/or in accessible external memory. Computer 150 processors may include, for example, a central processing unit (CPU) and one or more graphical processing units (GPUs). The internal memory may include, for example, RAM and ROM. An I/O interface enables communication with a keyboard, mouse, and external memory such as hard disk 160, for example.

Examples of special purpose computers include image processing devices such as digital cameras (an example of which includes, but is not limited to, the Epson R-D1 digital camera manufactured by Seiko Epson Corporation headquartered in Owa, Suwa, Nagano, Japan), digital camcorders, projectors, printers, scanners, copiers, portable photo viewers (examples of which include, but are not limited to, the Epson P-3000 or P-5000 portable photo viewers manufactured by Seiko Epson Corporation), or portable movie players, or some combination thereof, such as a printer/scanner/copier combination (examples of which include, but are not limited to, the Epson Stylus Photo RX580, RX595, or RX680, the Epson Stylus CX4400, CX7400, CX8400, or CX9400Fax, and the Epson AcuLaser® CX11NF manufactured by Seiko Epson Corporation) or a printer/scanner combination (examples of which include, but are not limited to, the Epson TM-J9000, TM-J9100, TM-J7000, TM-J7100, and TM-H6000III, all manufactured by Seiko Epson Corporation) or a digital camera/camcorder combination.

There are two aspects to the present invention that will be described in the following two sections: A. Identifying two or more barcodes in the same image with one of the barcodes being rotated or skewed with respect to the other; and B. Identifying large QR barcodes in an image.

A. Identifying Two or More Barcodes in the Same Image with One of the Barcodes Being Rotated or Skewed with Respect to the Other To understand this aspect of the present invention it is useful to understand the conventional method for decoding barcodes.

In the convention pipeline, the 1D decoder and 2D decoder are two separate modules. The reason why rotated barcodes like the barcode 1 shown in FIG. 1 are not decoded can be explained from the design of the conventional pipeline, which is shown in FIG. 3A.

Figures 3A, 3B:
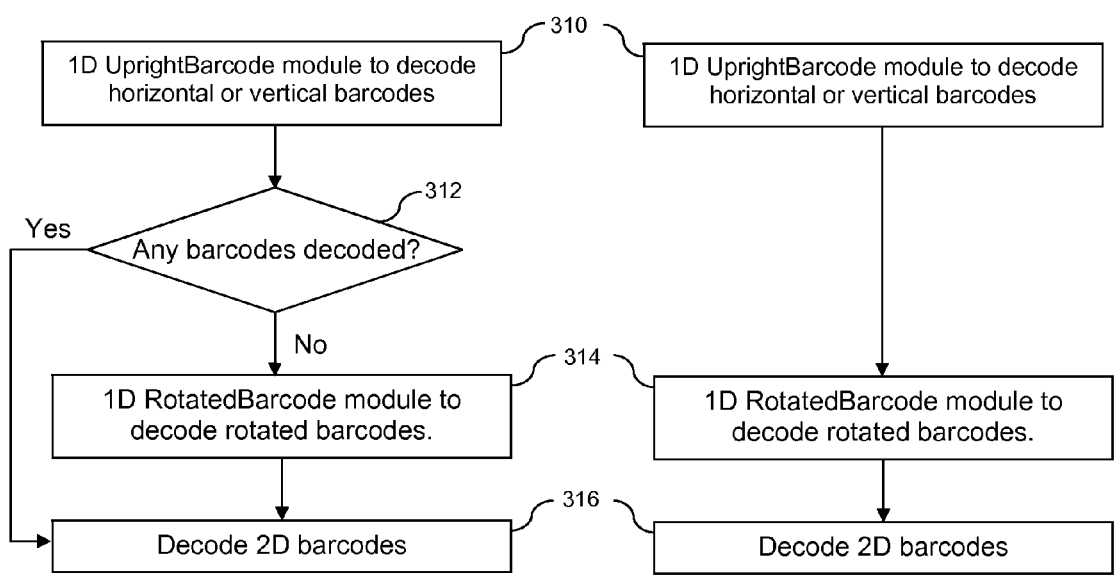
FIG. 3A illustrates a prior method for decoding multiple barcodes in a single image and FIG. 3B illustrates the general steps of the present invention.

In the conventional pipeline shown in FIG. 3A, one can see that if a barcode is decoded by the "UprightBarcode" module, then the "RotatedBarcode" module will not run at all. In step 310, the image is processed with a 1D UprightBarcode module to decode a horizontal or vertical barcode. If a barcode is detected, step 312 returns Yes, then the process moves to step 316 where the image is processed to decode a 2D barcode. If a an un-rotated barcode is not detected, step 312 returns No, then the process moves to step 314 where the image is processed with a 1D RotatedBarcode module to decode a rotated barcode. Typically, the digital image of a scanned object will only have a single 1D barcode. So, if it is identified in step 312, the process moves on to look for 2D barcodes. In other words, the "RotatedBarcode" module will run only when there are no barcodes decoded from the "UprightBarcode" module. This aspect of the present invention is not limited to, nor concerned with, a particular 1D or 2D barcode decoder. "1D UprightBarcode" module refers generally to a conventional horizontal or vertical barcode decoder. "1D RotatedBarcode" module refers generally to a conventional skewed barcode reading/decoding function, which generally detects a skew angle of the rotated/skewed barcode, deskews the image, and then tries to decode the horizontal or vertical barcode in the conventional manner. Although the present invention is not limited to, nor concerned with, a particular 1D or 2D barcode decoder, commonly owned U.S. Pat. No. 8,162,223 and commonly owned US Published Patent Application No. 2011/0215151 disclose 1D barcode decoding methods, and commonly owned U.S. Pat. No. 7,546,950 discloses a 2D barcode method, including detecting skewed barcodes. Commonly owned U.S. Pat. No. 8,162,223, US Published Patent Application No. 2011/0215151, and U.S. Pat. No. 7,546,950 are hereby incorporated by reference in their entirety.

In order to decode both non-rotated barcodes and rotated barcodes when both exist in one image, the present invention modifies the conventional pipeline. The new pipeline is illustrated in FIG. 3B. As shown, step 314 is performed regardless of the outcome of step 312, which is omitted in the present invention. The new pipeline ensures that a "RotatedBarcode" module will run after the "UprightBarcode" module.

With this improvement, the decoding accuracy is improved greatly on a sample set of images with barcodes, from 66.51% into 80.0% on a data set with 11,666 barcode samples.

With the new pipeline of the present invention, multiple barcodes with different orientations can be decoded.

We have also determined that some functions or modules designed to decode 1D barcodes can be reused to decode 2D barcodes. For example, in the conventional pipeline, PDF417 and 1D "UprightBarcode" modules run a similar "tokenization" function individually, and both 1D "UprightBarcode" module and PDF417 module scan the images, which means "tokenization" is duplicated and image scanning is duplicated as well. If we reduce the duplicated "tokenization" and duplicated image scanning steps, speed will be improved. PDF417 is a stacked linear barcode symbol format used in a variety of applications, primarily transport, identification cards, and inventory management. PDF stands for Portable Data File. The 417 signifies that each pattern in the code consists of 4 bars and spaces, and that each pattern is 17 units long.

Figure 4:
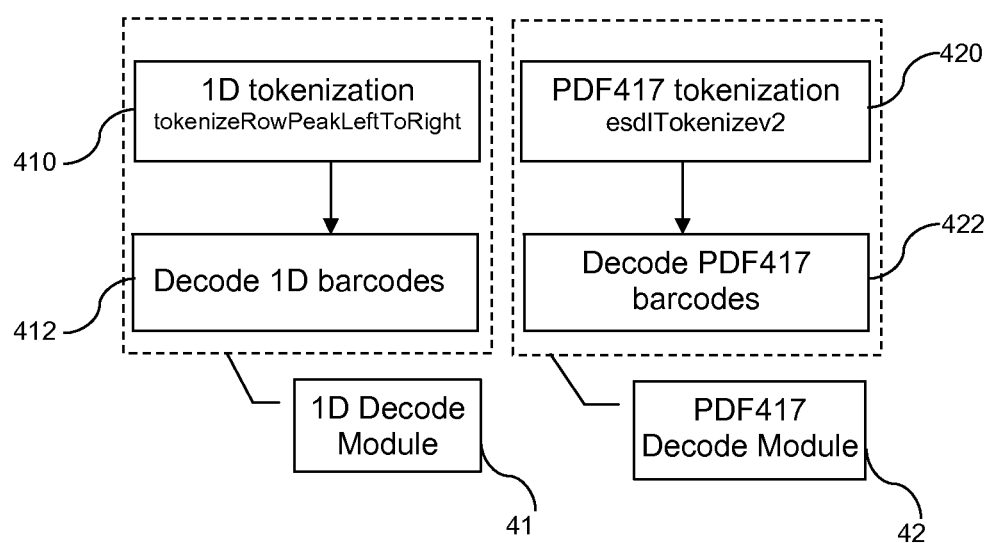
FIG. 4 shows a prior method for decoding both 1D and PDF417 barcodes in an image.
Figure 5:
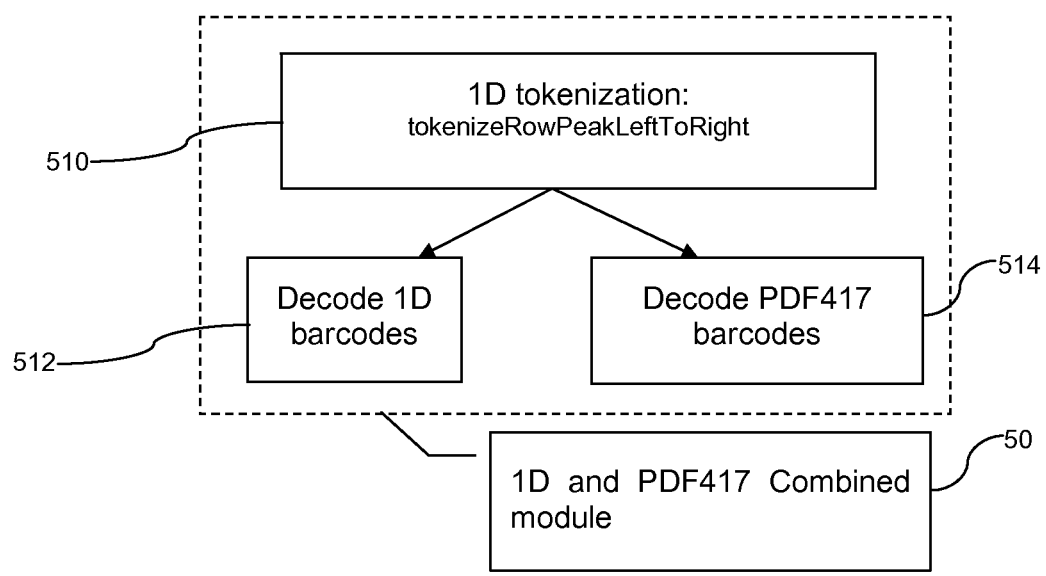
FIG. 5 shows the method of the present invention for decoding both 1D and PDF417 barcodes in an image.

In the present invention, "PDF417" and "UprightBarcode" decoding modules are combined into one module and the tokenization results are reused by both modules. FIGS. 4 and 5 illustrate in detail why speed can be improved. In the conventional pipeline shown in FIG. 4, the 1D decode module 41 and PDF417 decode module 42 are separate: the 1D tokenization function "tokenizeRowPeakLeftToRight" will be run (step 410) to decode 1D barcodes (step 412); and the PDF417 tokenization function "esdlTokenizev2" will be run (step 420) to decode PDF417 barcodes (step 422). Moreover, the same image will be scanned twice. Now, in the new pipeline of the present invention (FIG. 5), the two modules are combined as a 1D and PDF417 combined module 50. The 1D tokenization function "tokenizeRowPeakLeftToRight" runs first (step 510). Then, its results will be used by both 1D decode (step 512) and PDF417 decode (step 514) functions, which means that the time used by "esdlTokenizev2" is saved. Moreover, the image is only scanned once, which saves time as well.

With this improvement, the speed is improved by about 13%, reduced from 199 ms to 174 ms in one test condition. Moreover, due to the reuse of the 1D tokenization function, the PDF417 decoding accuracy is improved (PDF417 accuracy is improved from 98.68 to 99.05%) because the 1D tokenization function gives better results than the tokenization function used in the PDF417 decode module.

Figure 6:
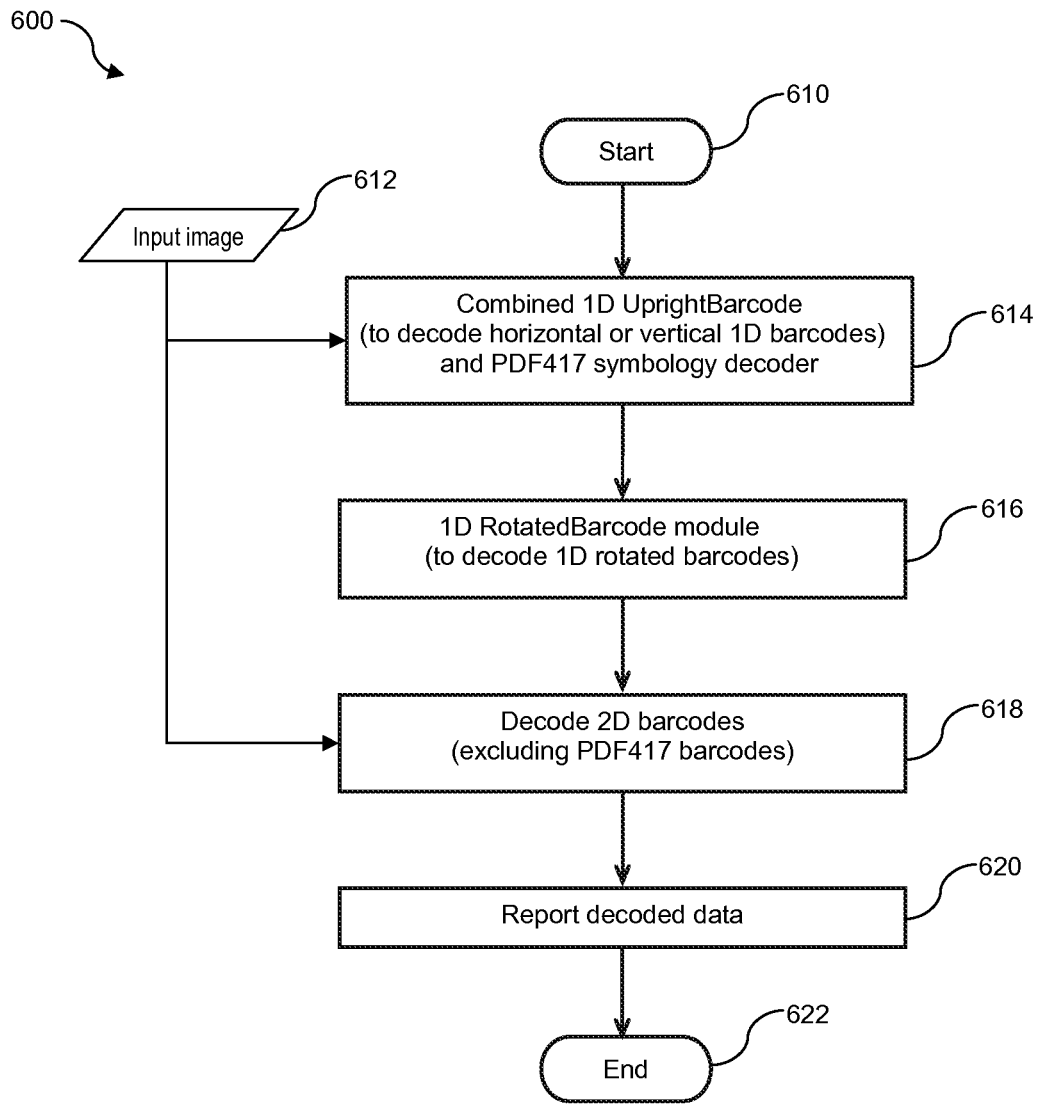
FIG. 6 is a flowchart showing the general steps of one aspect of the present invention.

FIG. 6 illustrates the general steps of method 600 of the present invention.

As discussed above, PDF417 and 1D symbologies are decoded in the same module 50 in order to improve the speed and accuracy.

As shown in FIG. 6, method 600 starts (step 610) with inputting an image (step 612) into the combined module 50 to decode horizontal or vertical 1D barcodes and PDF417 barcodes (step 614). The image could be input using scanner 112, or the image may have been previously stored in RAM 104 or hard disk 160, for example. The process then moves to step 616 to decode 1D rotated barcodes, which are rotated or skewed relative to the horizontal or vertical barcodes that can be detected (identified and or decoded) in combined module 50. The process then inputs the same image (step 612) to the module for decoding 2D barcodes, excluding PDF417 barcodes (step 618). The results of the decoding are then reported (step 620) and the process ends (step 622).

Thus, in the present invention, the 1D RotatedBarcode module always runs after the combined 1D UprightBarcode and PDF417 symbology decoder module 50 in order to improve the accuracy for identifying and/or decoding two or more barcodes in the same image with at least one barcode having a different orientation (rotated or skewed) with relation to at least one other barcode in the image.

In the following table 1, evaluation results on over 10,000 barcodes from the prior framework and the present invention are listed.

| Set | #Samples | Engine | Accuracy | | | | Speed |
|---|---|---|---|---|---|---|---|
| | | | ACC | MRR | MDR | FDR | |
| Overall | 11,666 | Prior Framework | 85.03% | 0.02% | 15% | 0.00% | 194 ms |
| | | Present Invention | 89.04% | 0.00% | 11% | 0.00% | 174 ms |

B. Identifying Large QR Barcodes in an Image

To understand this aspect of the present invention it is useful to understand the current method (prior to the present invention) for decoding QR barcodes.

Figure 7:
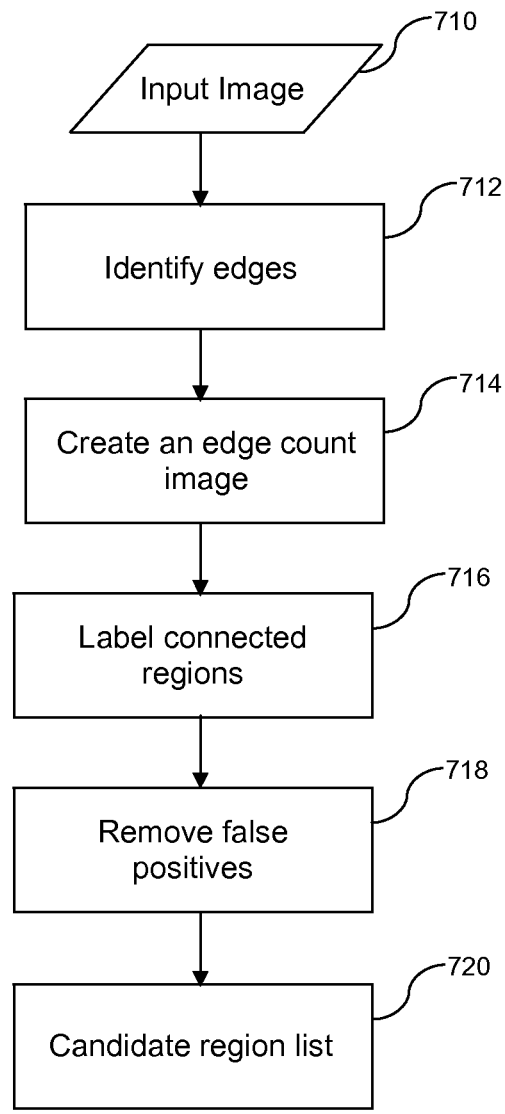
FIG. 7 is a flowchart showing the general steps of the current (prior to the present invention) method for decoding QR barcodes.

The flowchart of the current QR candidate region location method is shown in FIG. 7.

A digital image is input in step 710. The image could be input using scanner 112, or the image may have been previously stored in RAM 104 or hard disk 160, for example. In order to locate possible QR candidate regions in the input digital image, edges in the digital image are first identified (step 712). An edge-count image is then created (step 714) by scanning the digital image to locate edges as defined above, and representing the edges as pixel values in a new image. For example, in order to create the edge-count image, a pixel of value seven (7) represents seven (7) edges in a corresponding 8×8 region of the digital image. The edge count image is one-eighth the size of the input digital image, facilitating very fast subsequent processing. The edge count image typically comprises a plurality of squares. Adjacent "edgy" squares (i.e. with higher pixel values) in the edge-count image are labeled as associated with a common region.

In exceptionally large images, the edges may not be concentrated enough to identify correct symbol-containing regions. In such a case, a higher reducing scale rather than eight (8) may be contemplated.

During labeling (step 716), the image is scanned once and connected regions are listed in an association table that uses a tree structure in which, for instance, two regions may be associated by having a common third region as their root.

At this point, all regions under the size of a predefined value, EDGE_AREA_THRESHOLD, are assumed too small to be a QR symbol and are filtered out as false positives (step 718). The remaining regions form the candidate region list (step 720).

Decoding will then be performed in each candidate region. If a candidate region contains a whole QR code, decoding in this region may succeed. If a candidate region does not cover a whole QR code, decoding in this region will definitely fail.

The current method shown in FIG. 7 works well when a QR code is smaller than or equal to N pixels in the image (N is the image downscaling factor; it is 8 for 200 DPI image).

The maximum QR module size supported by the current implementation shown in FIG. 7 can be calculated based on the QR candidate region location method described above.

The maximum QR module size supported is a function of the following factors:
image downscaling factor, N, used to create edge count map; and
image resolution, DPI.

Each pixel in the edge count map represents the number of edge points in an N×N region. If the size of one QR module is larger than N pixels, then it is unlikely that any edge point will be detected in an N×N region. In this case, the edge count map will tend to be more sparsely distributed and edge points are unlikely to be connected into one region.

Based on the current implementation, a maximum module size of N pixels will be optimum for edge point connectivity and also for barcode candidate region location. Specifically, the maximum QR module size is given by:

MAX_MODULE_SIZE=$N$/DPI.

For image resolutions of 200 dpi, 300 dpi and 600 dpi, a scale factor of 8, 16 and 32 are used, respectively. This results in a maximum module size of 0.04" at 200 dpi, 0.05" at 300 dpi and 0.05" at 600 dpi. Selecting a minimum value from these results yields a maximum module size of 0.04".

Figure 8:
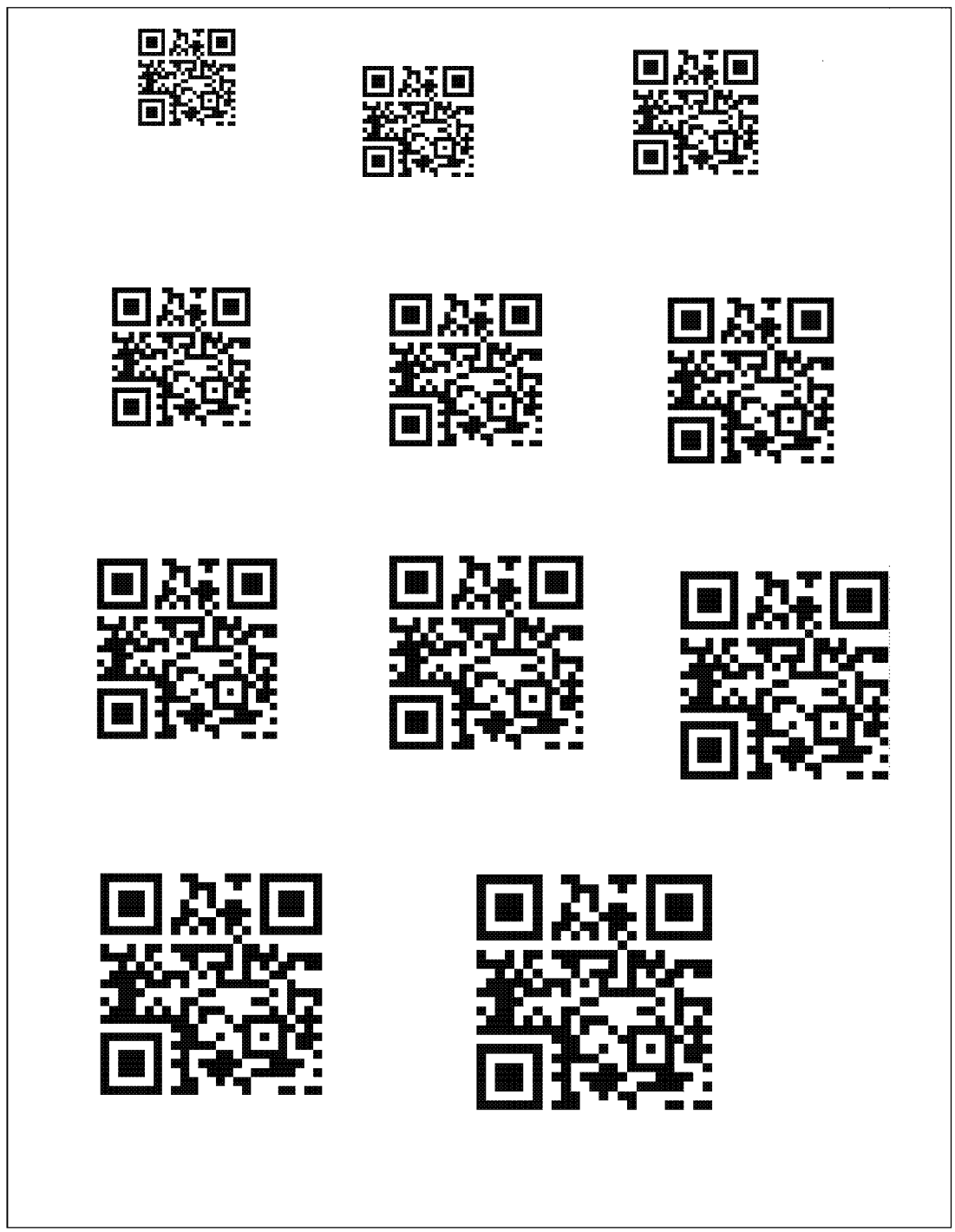
FIG. 8 shows an input image of 200 DPI with 11 QR codes whose module sizes range from 7 pixels to 17 pixels.
Figure 10:
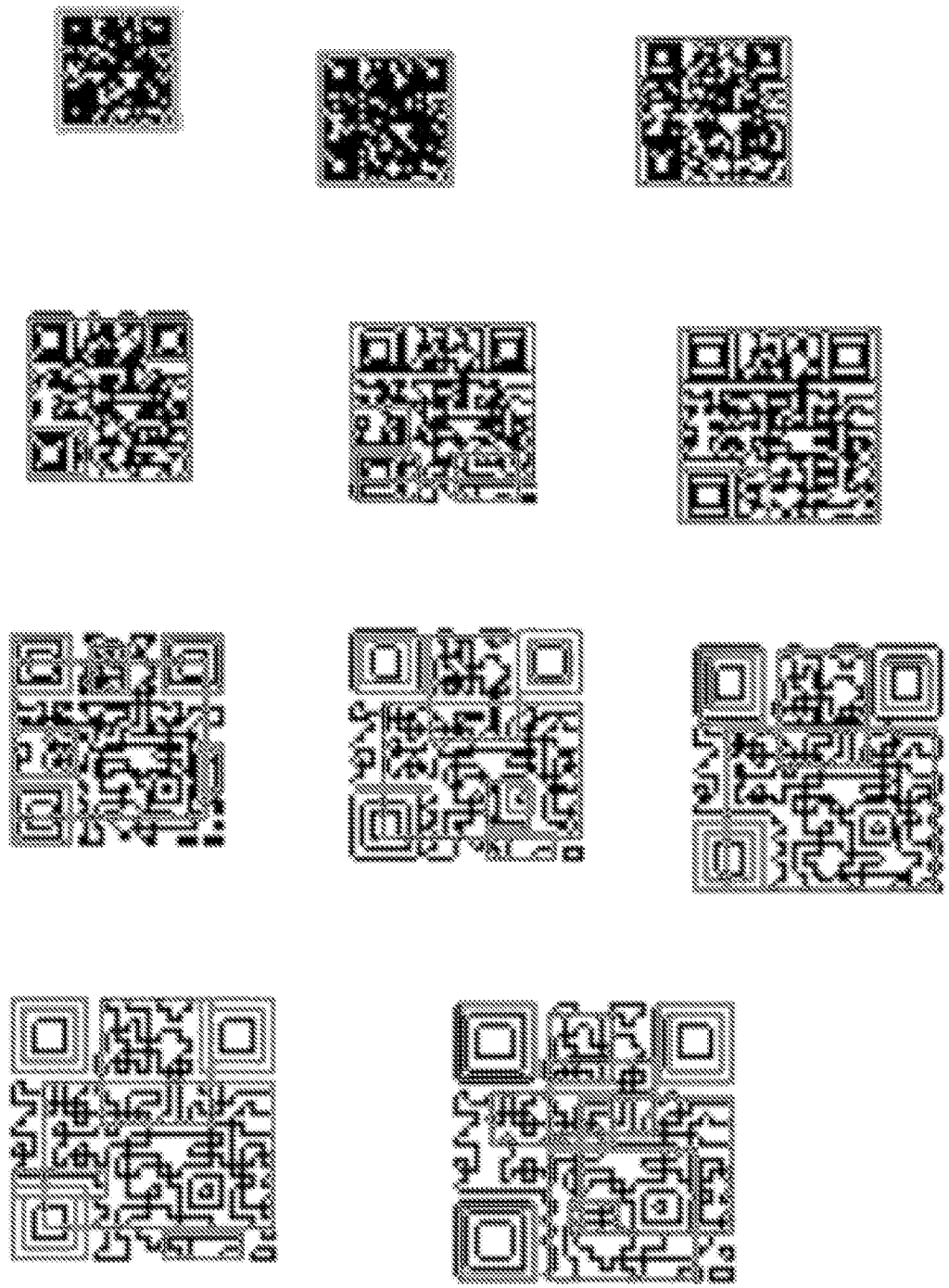
FIG. 10 shows candidate regions detected in the input image.

FIG. 8 shows an example input image of 200 DPI with 11 QR codes whose module sizes range from 7 pixels to 17. The corresponding downscaled edge count image is shown in FIG. 9. The candidate regions are displayed in FIG. 10 with each solid-line rectangle containing one candidate region.

Figure 11:
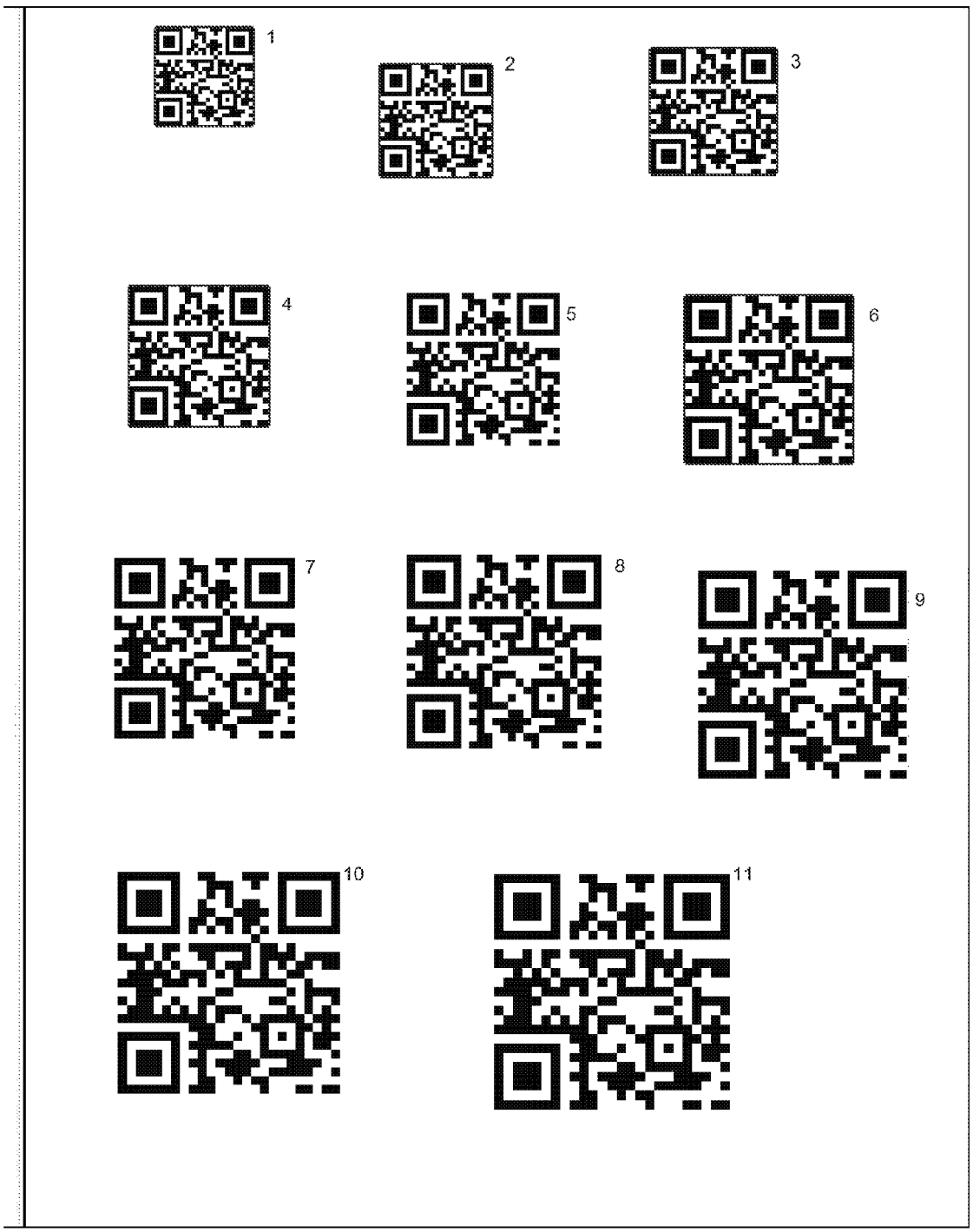
FIG. 11 shows the decoded QR codes.

In FIG. 11, the successfully decoded QR codes are displayed as solid-line rectangles surrounding the QR code and there are 5 QR codes that are decoded. They are 1, 2, 3, 4, and 6. The remaining 6 QR codes cannot be decoded.

The reason that those 6 QR codes fail to be is as follows. For the 5 QR codes decoded properly (QR codes 1, 2, 3, 4, 6), there exists one QR candidate region that covers the whole QR. For smaller QR codes, there is only one candidate region covering the whole QR codes. When the QR code becomes larger, more candidate regions are detected in the same QR code area. For those QR codes that cannot be decoded (QR codes 5, 7, 8, 9, 10, 11), there is no single candidate region that covers the whole QR code. Instead, there are multiple small regions detected in the QR code region while none of them covers the whole QR code. This normally happens on large QR codes because the edge points in the edge count map are not all connected when the module size becomes large. Therefore, failure to decode a large QR code is actually due to the location problem.

The present invention overcomes this problem of detecting and decoding large QR codes.

In order to decode a large QR code like those shown in FIG. 8, the candidate region that covers the whole QR code must be detected. Looking at, say, QR code 10, in FIG. 11, one can see that even though there is no one candidate region that covers the whole QR code 10, there are several small candidate regions that are detected in QR code 10 area and these regions overlap. If these overlapped regions are merged into one large region, the large region will cover the whole QR code 10. This observation led to the solution of the present invention: merge overlapped regions and add the merged regions into the candidate region list.

Figure 12:
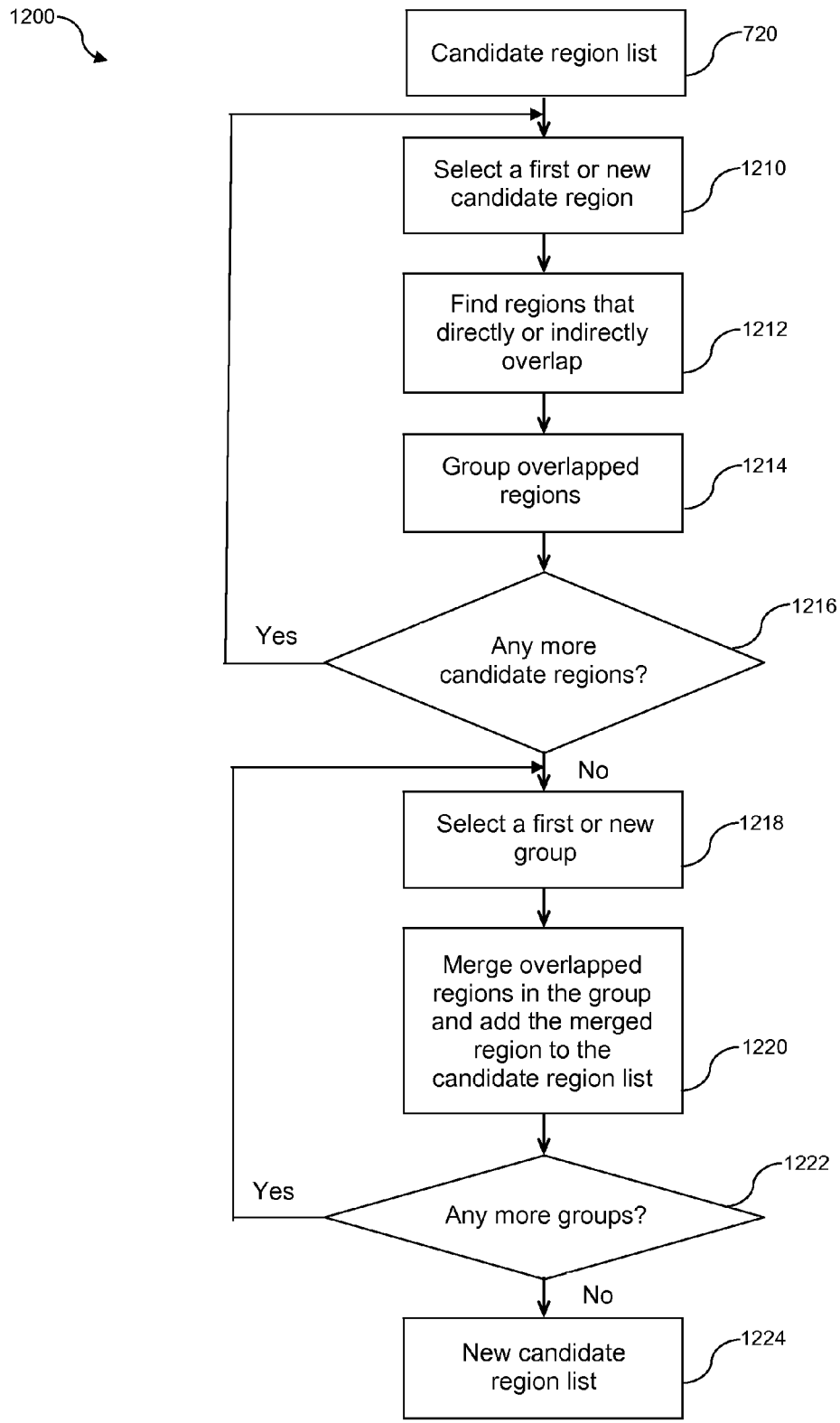
FIG. 12 is a flowchart showing the general steps of the method of the present invention for decoding QR barcodes.

In the present invention a new module added to the current QR candidate region location module shown in FIG. 7. FIG. 12 is a flowchart of the new method 1200 of the present invention for locating large QR codes.

The input of the new module 1200 takes the output of the QR candidate regions 720 from the current QR location module (FIG. 7). For each particular candidate region (step 1210 selects a first or new candidate region) the new module 1200 tries to find all regions that overlap with the particular candidate region (step 1212). Next, the method groups all overlapped regions together into a group (step 1214). Step 1216 determines if there are more candidate regions in the list to look at. If step 1216 returns Yes, the process loops back to step 1210 to select a new candidate region and steps 1212 and 1214 are repeated to form an additional group. This process iterates until step 1216 returns No, i.e. there are no more candidate regions in the list. In step 1218, a first or new group is selected from the groups formed in the previous steps. For a particular group, the overlapped regions are merged into a single merged region and that merged region is added to the candidate region list 720 (step 1220). Step 1222 determines if there are any more groups to look at. If step 1222 returns Yes, the process loops back to step 1218 to select a new group and step 1220 repeats to form an additional merged region that is added to the candidate region list. This process iterates until step 1222 returns No, i.e. there are no more groups. The result is a new candidate region list 1224.

Decoding will be performed in each candidate region in the new, updated candidate region list 1224.

From FIG. 12, it can be seen that three major modules are utilized in the method of the present invention: (1) a module to find all the overlapped regions; (2) a module to record all the corresponding overlapped regions into a group; and (3) a module to merge overlapped regions in each group and add the merged region to the candidate region list.

Figure 13:
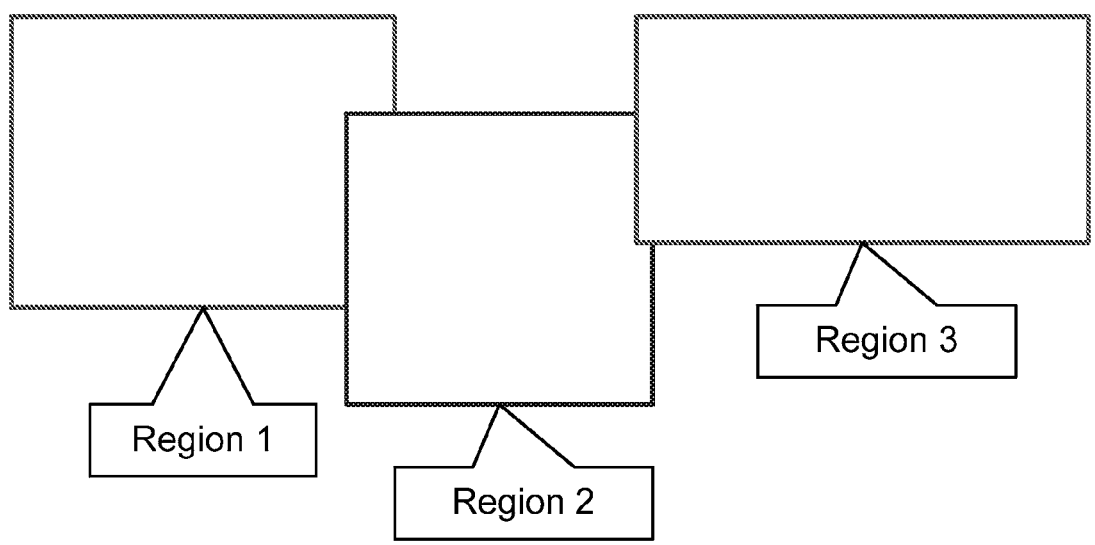
FIG. 13 illustrates the types of overlapped regions.

FIG. 13 illustrates directly overlapped regions and indirectly overlapped regions. Region 2 overlaps with region 1 directly as shown in FIG. 13, These 2 regions are referred to herein as "directly overlapped regions."

Region 3 overlaps with region 2 directly and region 2 overlaps with region 1 directly as shown in FIG. 13. Regions 3 and 1 are referred to herein as "indirectly overlapped regions."

The present invention includes a module to find all overlapped regions. For each particular candidate region, this module searches for the regions that directly or indirectly overlap with the particular candidate region.

Figure 14A:
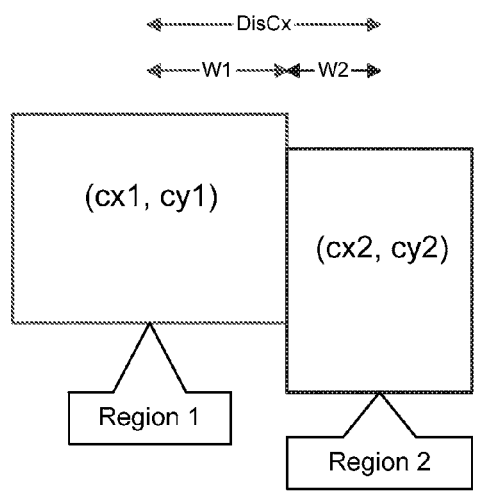
FIG. 14A illustrates the minimum overlap between two regions arranged horizontally; and, FIG. 14B illustrates the minimum overlap between two regions arranged vertically.
Figure 14B:
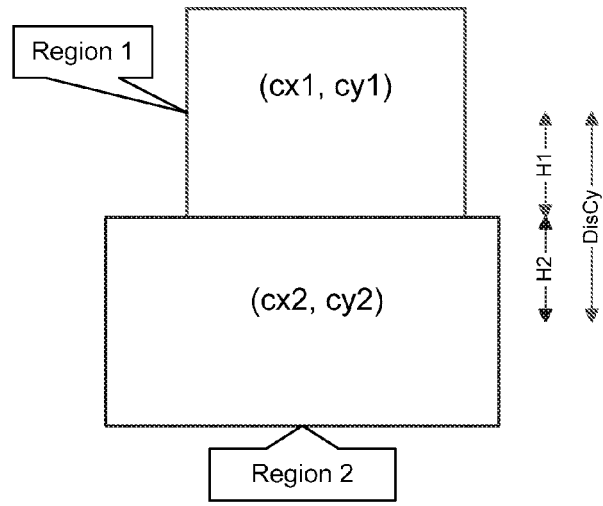

Basically, there are two types of overlapping: two regions overlap horizontally as shown in FIG. 14A; or two regions overlap vertically as shown in FIG. 14B.

In the case of horizontally overlapped regions, the distance between their centers in the x direction "DisCx" (cx1−cx2) is equal to the sum of the width "W1+W2" where W1=(width of Region 1÷2) and W2=(width of Region 2÷2). In this example, the two overlapped regions is in the extreme case in which they will not overlap if either one is separated from the other by even one pixel horizontally. Therefore, "W1+W2" can be considered as a threshold to determine if two regions overlap horizontally. The following Equation (1) can be used to determine the horizontally overlapped regions:

$$DisCx = |cx2 - cx1|,$$

$$W1 = \frac{\text{width of } region1}{2},$$

$$W2 = \frac{\text{width of } region2}{2}$$

If $(DisCx < W1 + W2)$ then two regions are overlapped where cx1 is the center of region1 in the x direction and cx2 is the center of region2 in the x direction.

Similarly, the following Equation (2) can be used to determine the vertically overlapped regions as shown in FIG. 14B:

$$DisCy = |cy2 - cy1|,$$

$$H1 = \frac{\text{height of } region1}{2},$$

$$H2 = \frac{\text{height of } region2}{2}$$

If $(DisCy < H1 + H2)$ then two regions are overlapped where cy1 is the center of region1 in the y direction and cy2 is the center of region2 in the y direction.

A list named "RegionList" 720 records all the candidate regions output from the current candidate region location module (FIG. 7). The total number of regions is saved in "RegionList→regionNum". For the ith candidate region in the list "RegionList", its region information like the center, width and height can be visited through "RegionList[i]". According to Equations (1) and (2), the pseudo code below will output whether or not any two regions directly overlap:

```
disCx = | RegionList[index1]->cx - RegionList[index2]->cx | ;
disCy = | RegionList[index1]->cy - RegionList[index2]->cy | ;
T1 = (RegionList[index1]->Width + RegionList[index2]->Width ) / 2 ;
T2 = (RegionList[index1]->Height + RegionList[index2]->Height) / 2 ;
if ( (disCx < T1) && disCy < T2)) ) "The two regions overlap";
else "The two regions are not overlapped"
```

The pseudo code for module "FindOverlappedRegions" shown below illustrates how to search directly and indirectly overlapped regions for region i and then record them into one group. RegionList[i]->state is to indicate if a region "RegionList[i]" has been put in a group to avoid duplicate checking. Array "groupArray" is used to record all the groups and all the overlapped regions in each group. For example, "groupArray[i]" is used to record all the overlapped regions belongs to group i: groupArray[i][1 . . . n] saves the region index of the directly or indirectly overlapped regions for group i. Note that groupArray[i] [0] is used to save the total number of regions in the group. The pseudo code is as follows:

```
Register region i as the first region in its own group:
groupArray[groupNum][1] = i;
    Set objNum = 2;
    Loop region j from i+1 to RegionList->regionNum
    {
        if(!RegionList[j]->state) continue;
        Loop k from 0 to objNum
        {
            if (IsRegionOverlap(regionList,j,
            groupArray[groupNum][k+1]))
            // if overlapped regrion is found
            {
                Record region j in the array:
                groupArray[groupNum][objNum+1] = j;
                Set RegionList[j]->state to FALSE indicating this
region belongs to one group already;
                Update the number of regions in this group:
                objNum++;
                    Jump out of the k loop.
            }
        }
    }
```

The present invention includes a module to group all overlapped regions. This module outputs the number of groups found and all the overlapped regions in each group. For each region, it calls "FindOverlappedRegions" to find all the directly and indirectly overlapped regions, record the overlapped regions and the number of regions for each group and the number of groups.

If there is only one region in a group, it means there are no overlapped regions found for this group. The merging of overlapped regions will performed on the groups with more than one overlapped regions. The pseudo code for the function "GroupOverlappedRegions" is shown below:

```
group Num =0;
Loop i from 0 to RegionList->regionNum
{
    Initialize region's state: RegionList[i]->state = TRUE;
}
Loop i from 0 to RegionList->regionNum
{
    if RegionList[i]->state is false (means this region has joined one
group already) then check next region in the list;
    FindOverlappedRegions(region i);
    Save the total number of overlapped regions:
    groupArray[groupNum][0] = objNum;
        Update the total number of groups: groupNum++;
}
```

The present invention includes a module to merge all overlapped regions and update the candidate region list. This module merges all the overlapped regions in the same group and adds the merged region into the region list. The pseudo code for "MergeOverlappedRegions" is shown below:

```
nGroup = GroupOverlappedRegions (regionList);
Loop i from 0 to nGroup
{
    //do not consider groups with only one region (no overlapped
    regions found)
    if the number of regions in group i (groupArray[i][0]) is 1, then
go to check next region;
    calculate the minimum bounding box "R" which covers all the
regions in the group "i";
    create a new region "regionTmp" and update its bounding box
information to R and other information based on all the regions in the
group i.
    Add "regionTmp" into "regionList".
}
```

Figure 15A:
FIG. 15A illustrates the result of the current (prior to the present invention) method for decoding QR barcodes where no single candidate region covers the entire large QR code; and, FIG. 15B illustrates the result of the method of the present invention for decoding QR barcodes where a single merged-region candidate covers the entire large QR code.
Figure 15B:

The results of the method 1200 of the present invention can be seen in a comparison of FIG. 15A to 15B.

In FIG. 15A, one large QR code and its corresponding candidate regions detected from the current (prior to the present invention) QR location method (FIG. 7) are displayed in solid rectangles and no single candidate region covers the whole QR code. No QR code will be decoded on these candidate regions. The new QR location module of the present invention, method 1200, outputs a merged region which is a solid surrounding rectangle in FIG. 15B, and a QR code is correctly decoded from this region.

Figure 16:
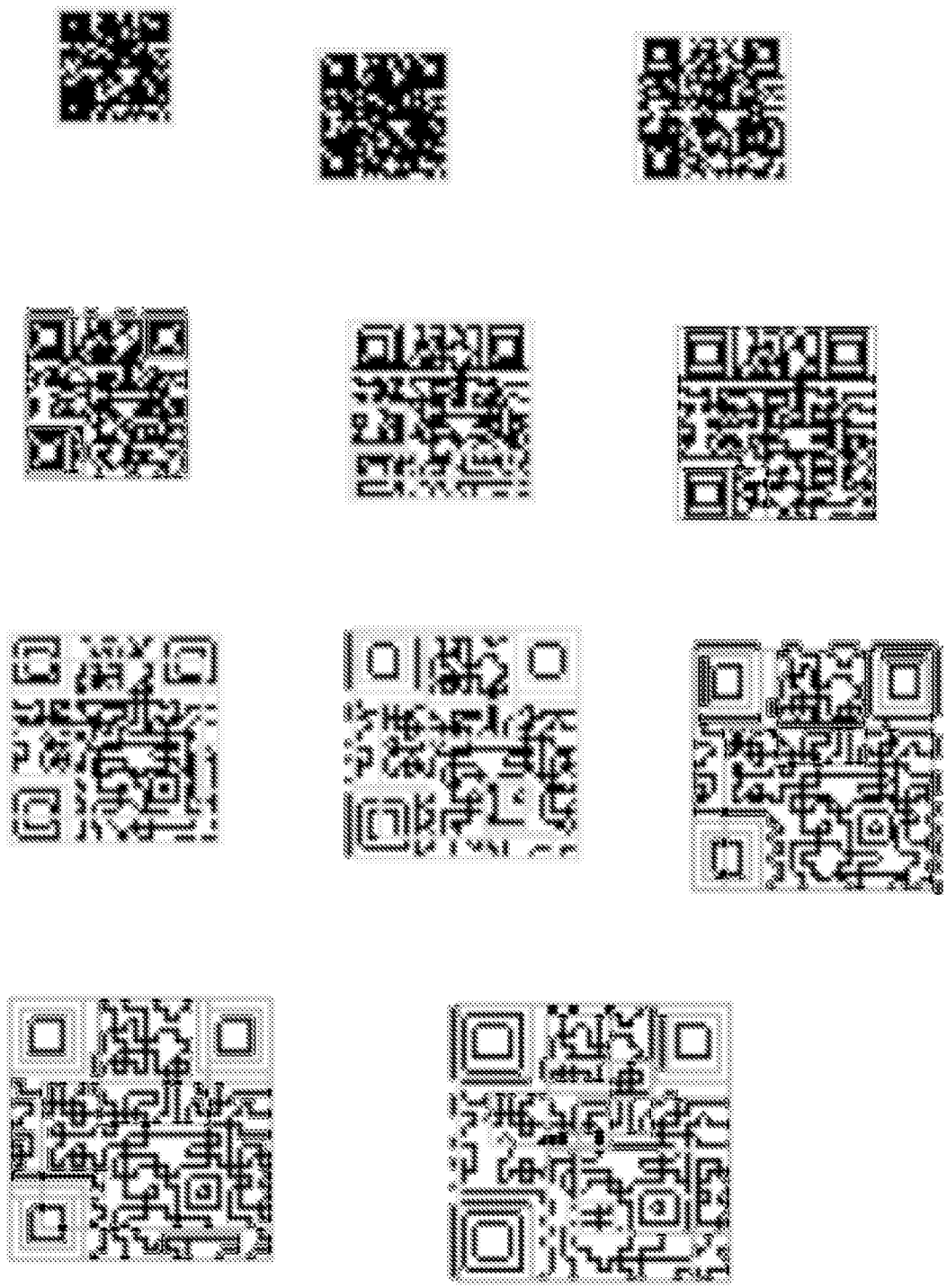
FIG. 16 shows the candidate regions detected by the method of the present invention.
Figure 17:
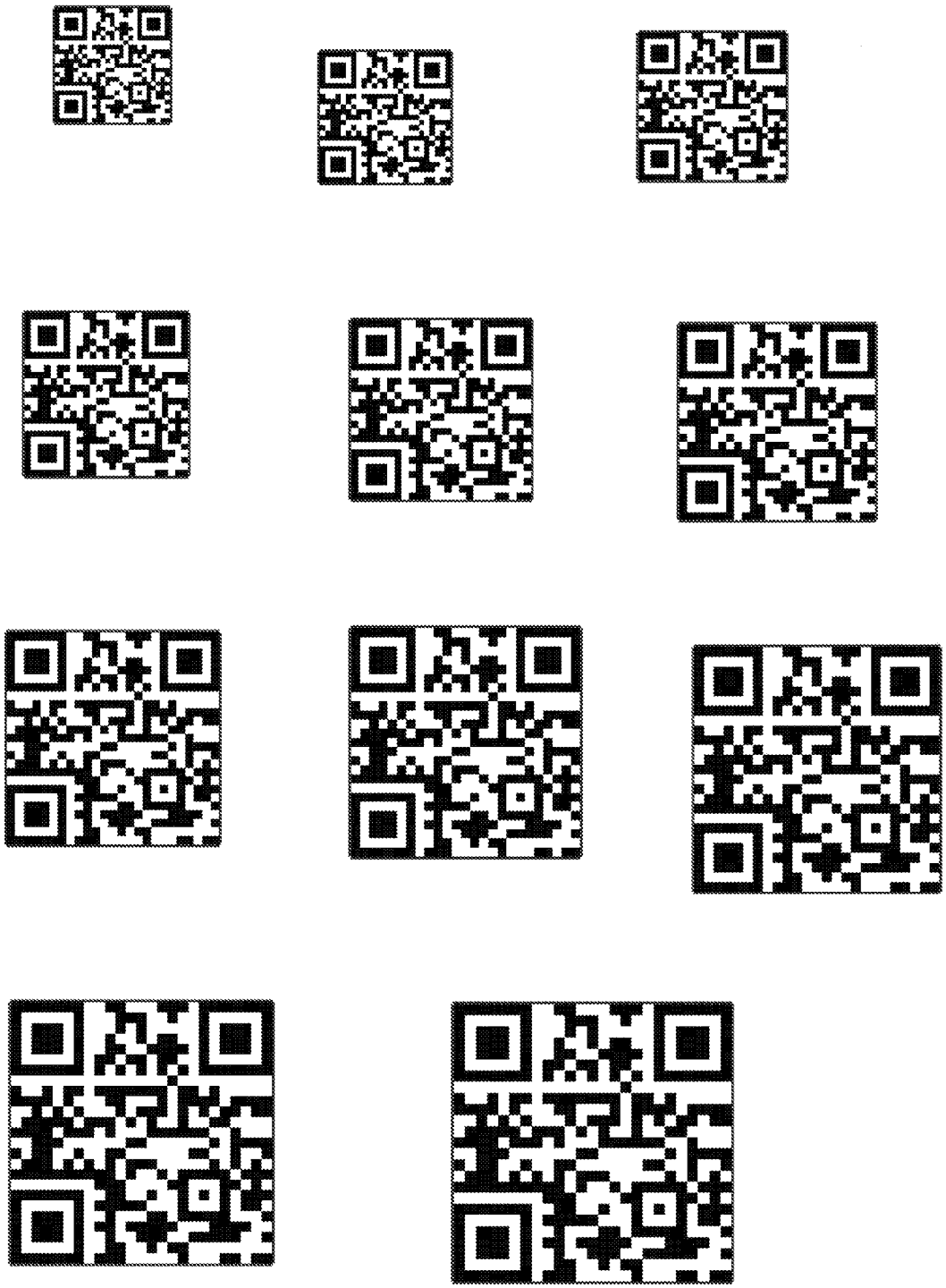
FIG. 17 shows the QR codes that are located and decoded by the method of the present invention.

For the QR codes in FIG. 8, originally there are 5 QR codes that are located by the current (prior to the present invention) QR location method (FIG. 7) and so only 5 QR codes are decoded. With the new QR location module of the present invention, method 1200, all 11 QR codes can be located and decoded. The results are shown in FIG. 16, which shows the candidate regions as solid rectangles, and FIG. 17, which shows the merged region as a solid rectangle surrounding each QR code.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method for identifying a QR code in an image, comprising:
    inputting an image;
    using a processor to:
        identify edges in the image;
        create an edge count image;
        label connected regions in the edge count image;
        create a candidate region list;
        for each individual candidate in the candidate region list:
            find regions that overlap with the region in the individual candidate;
            group regions that overlap into a group of overlapped regions;
        for each group:
            merge the overlapped regions into a merged region;
            add each merged region to the candidate region list to form a new candidate region list; and
        perform decoding of a QR code in each region in the new candidate region list.

2. A method for identifying a QR code in an image as in claim 1, wherein finding regions that overlap with the region in the individual candidate comprises:

finding horizontal overlap between two regions, region1 and region2 as follows $$DisCx = |cx2 - cx1|,$$
$$W1 = \frac{\text{width of } region1}{2},$$
$$W2 = \frac{\text{width of } region2}{2}$$
If $(DisCx < W1 + W2)$ then two regions are overlapped where cx1 is the center of region1 in the x direction and cx2 is the center of region2 in the x direction.

3. A method for identifying a QR code in an image as in claim 1, wherein finding regions that overlap with the region in the individual candidate comprises:
finding vertical overlap between two regions, region1 and region2 as follows $$DisCy = |cy2 - cy1|,$$
$$H1 = \frac{\text{height of } region1}{2},$$
$$H2 = \frac{\text{height of } region2}{2}$$
If $(DisCy < H1 + H2)$ then two regions are overlapped where cy1 is the center of region1 in the y direction and cy2 is the center of region2 in the y direction.

4. A method for identifying at least two barcodes in the same image with one barcode being rotated with respect to another barcode, comprising:
inputting an image;
using a processor to:
decode a horizontal or vertical barcode in the image, including decoding a PDF417 barcode;
next, decode a rotated barcode in the image, the rotated barcode being rotated with respect to the horizontal or vertical barcode.

5. A method for identifying at least two barcodes in the same image with one barcode being rotated with respect to another barcode, comprising:
inputting an image;
using a processor to:
decode a horizontal or vertical barcode in the image;
next decode a rotated barcode in the image, the rotated barcode being rotated with respect to the horizontal or vertical 1 barcode;
after decoding the rotated barcode in the image, then decode a 2D barcode.

6. A method for identifying at least two barcodes in the same image as in claim 5, wherein the 2d barcode is a QR code and further comprising:
using the processor to:
identify edges in the image;
create an edge count image;
label connected regions in the edge count image;
create a candidate region list;
for each individual candidate in the candidate region list:
find regions that overlap with the region in the individual candidate;
group regions that overlap into a group of overlapped regions;
for each group:
merge the overlapped regions into a merged region;
add each merged region to the candidate region list to form a new candidate region list; and
perform decoding of a QR code in each region in the new candidate region list.

7. A device for identifying a QR code in an image, comprising:
a unit for inputting an image;
a processor that:
identifies edges in the image;
creates an edge count image;
labels connected regions in the edge count image;
creates a candidate region list;
for each individual candidate in the candidate region list:
finds regions that overlap with the region in the individual candidate;
groups regions that overlap into a group of overlapped regions;
for each group:
merges the overlapped regions into a merged region;
adds each merged region to the candidate region list to form a new candidate region list; and
performs decoding of a QR code in each region in the new candidate region list.

8. A device for identifying a QR code in an image as in claim 7, wherein finding regions that overlap with the region in the individual candidate comprises:
finding horizontal overlap between two regions, region1 and region2 as follows $$DisCx = |cx2 - cx1|,$$
$$W1 = \frac{\text{width of } region1}{2},$$
$$W2 = \frac{\text{width of } region2}{2}$$
If $(DisCx < W1 + W2)$ then two regions are overlapped where cx1 is the center of region1 in the x direction and cx2 is the center of region2 in the x direction.

9. A device for identifying a QR code in an image as in claim 7, wherein finding regions that overlap with the region in the individual candidate comprises:
finding vertical overlap between two regions, region1 and region2 as follows $$DisCy = |cy2 - cy1|,$$
$$H1 = \frac{\text{height of } region1}{2},$$
$$H2 = \frac{\text{height of } region2}{2}$$
If $(DisCy < H1 + H2)$ then two regions are overlapped where cy1 is the center of region1 in the y direction and cy2 is the center of region2 in the y direction.

10. A device for identifying a QR code in an image as in claim 7, wherein the unit for inputting an image is a scanner.

11. A device for identifying a QR code in an image as in claim 7, further comprising a memory for storing the image.

* * * * *